Oct. 29, 1968

W. E. BALDWIN 3,407,468

APPARATUS FOR ALTERING THE CONFIGURATION OF
ELECTRICAL COILS OF INDUCTIVE DEVICES

Filed Dec. 10, 1965

Inventor:
William E. Baldwin,
by Henry J. Marwick
Attorney.

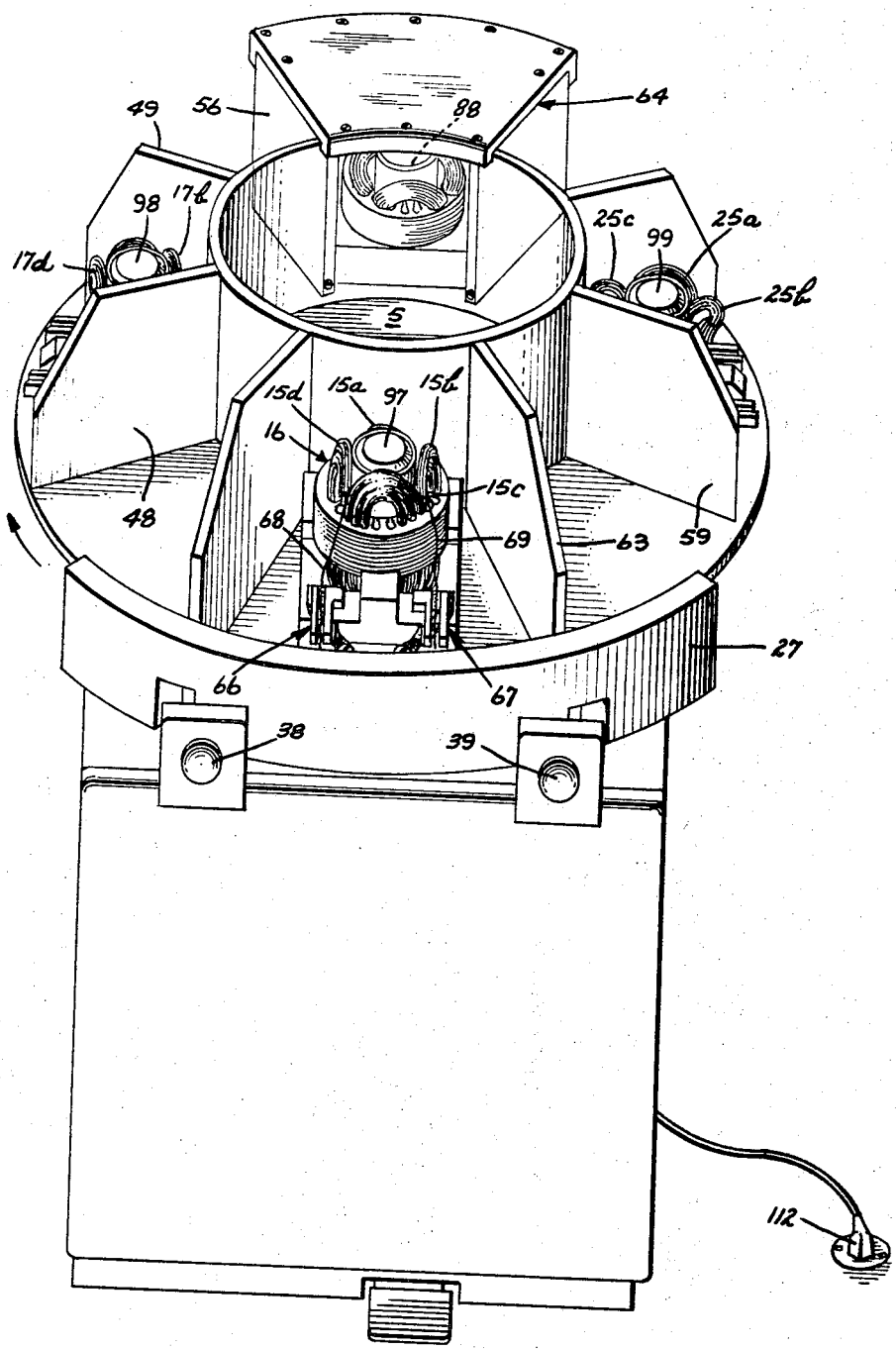

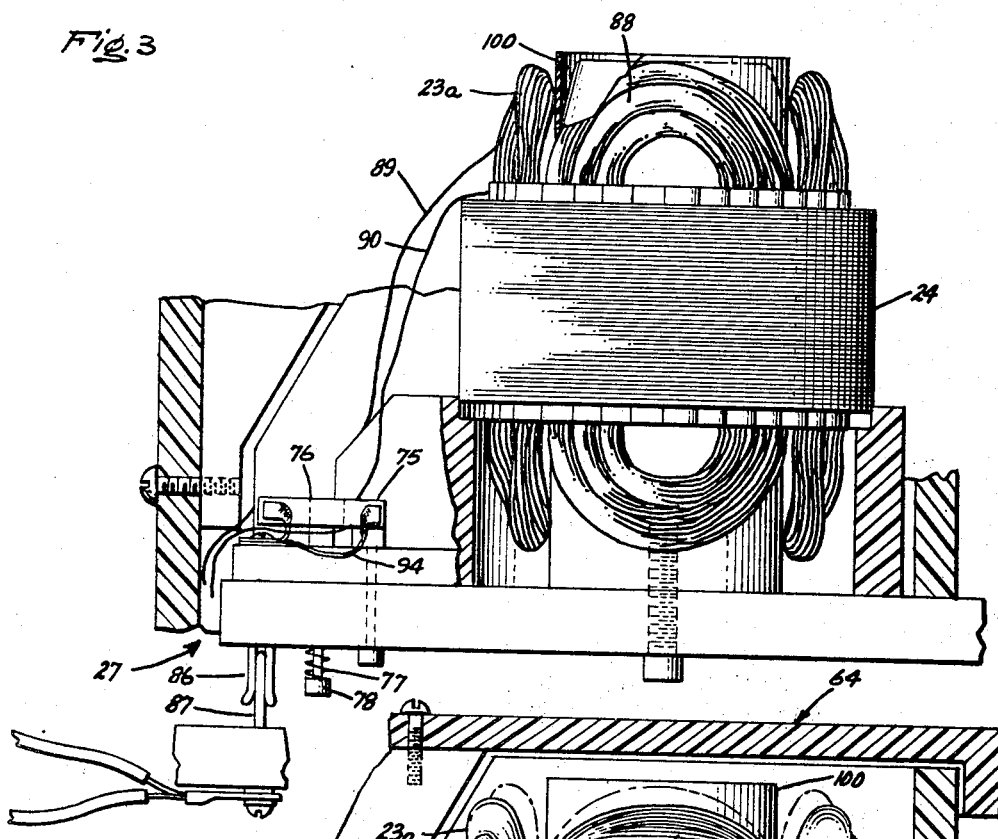
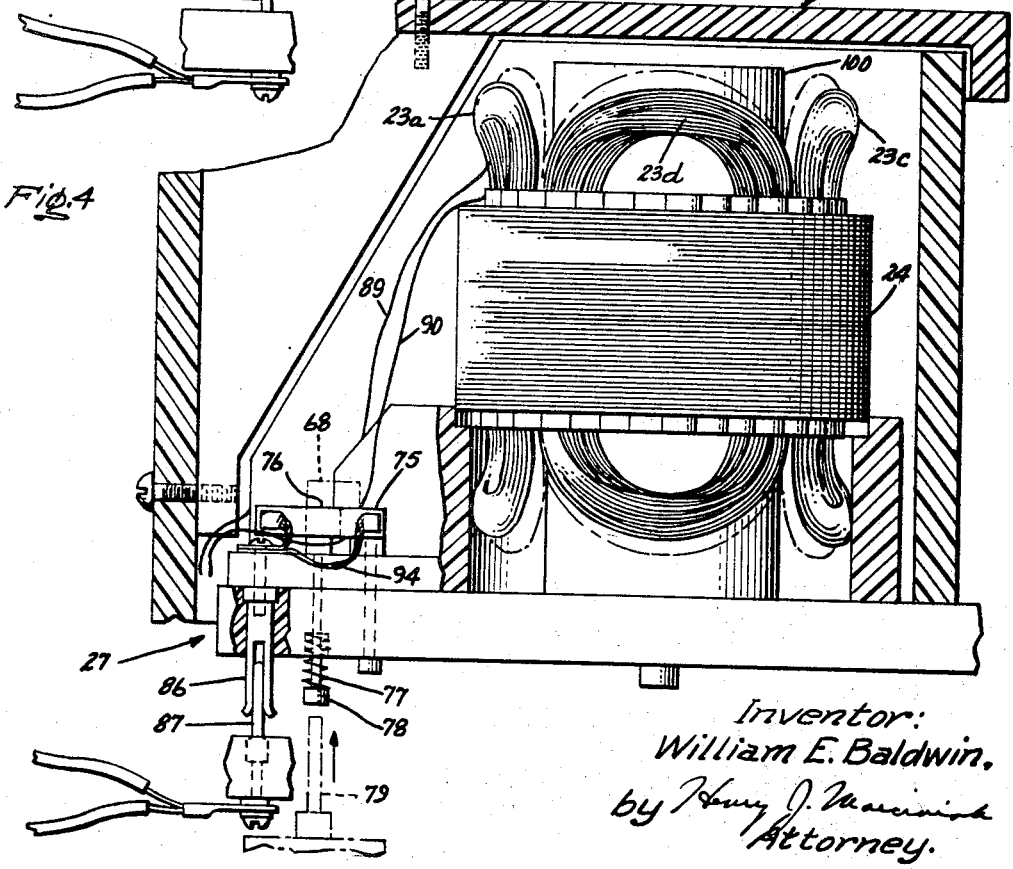

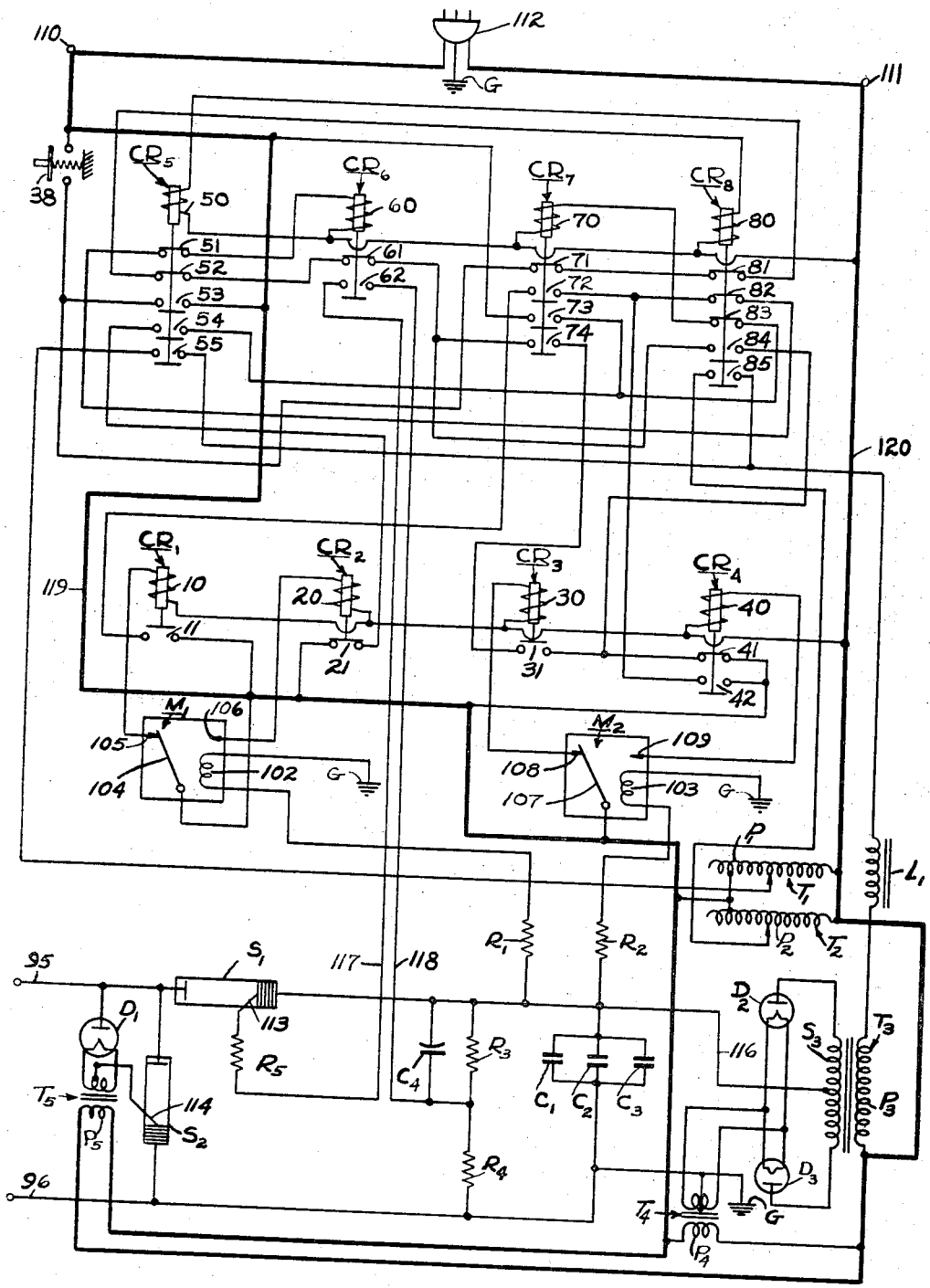
FIG_5

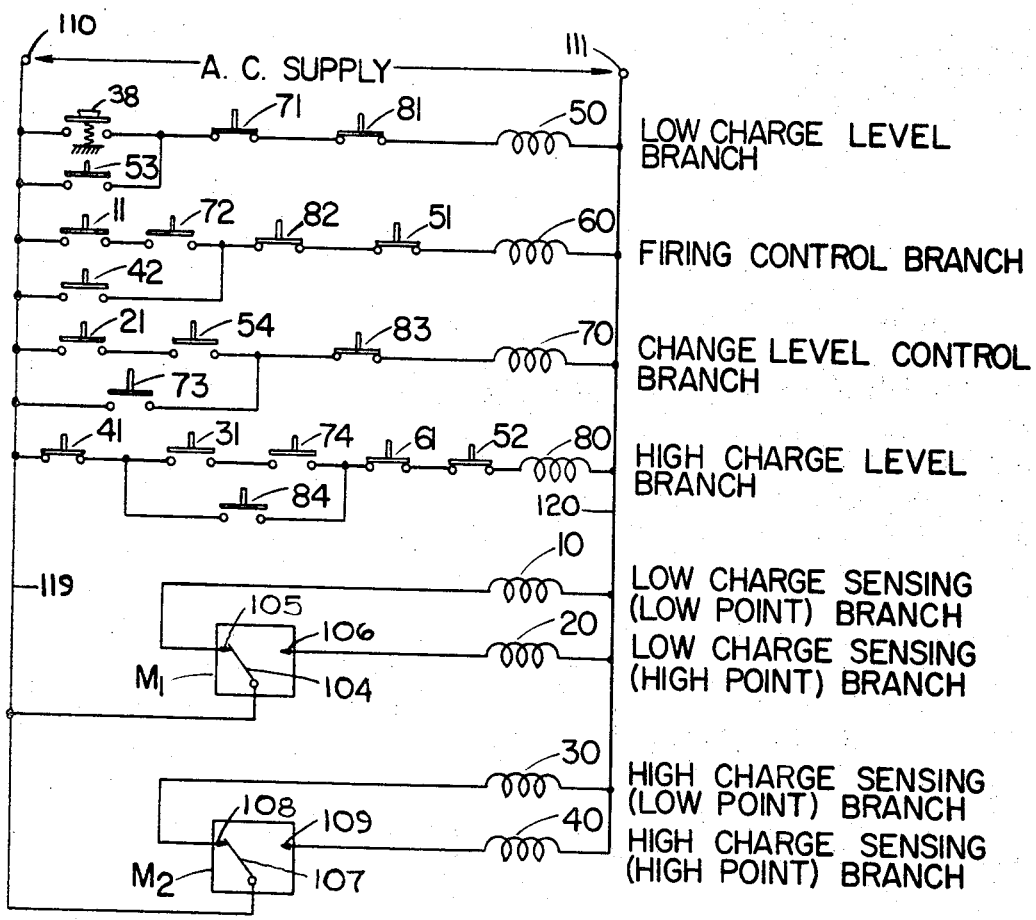

LOW LEVEL CHARGE CONDITION

LOW LEVEL CHARGE FIRING CONDITION

INVENTOR:
William E. Baldwin
BY John M. Stoudt
ATTORNEY

HIGH LEVEL CHARGE START CONDITION

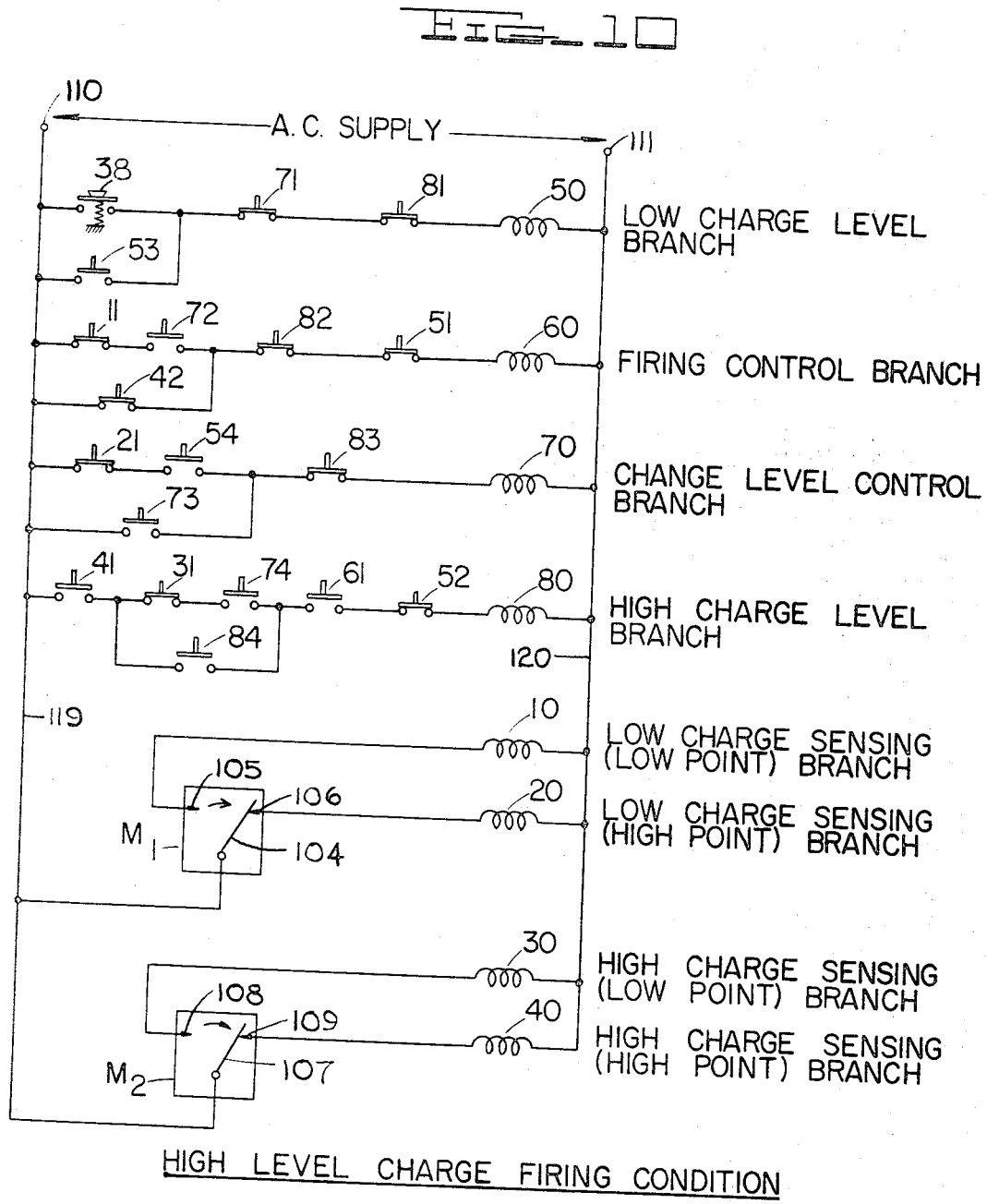

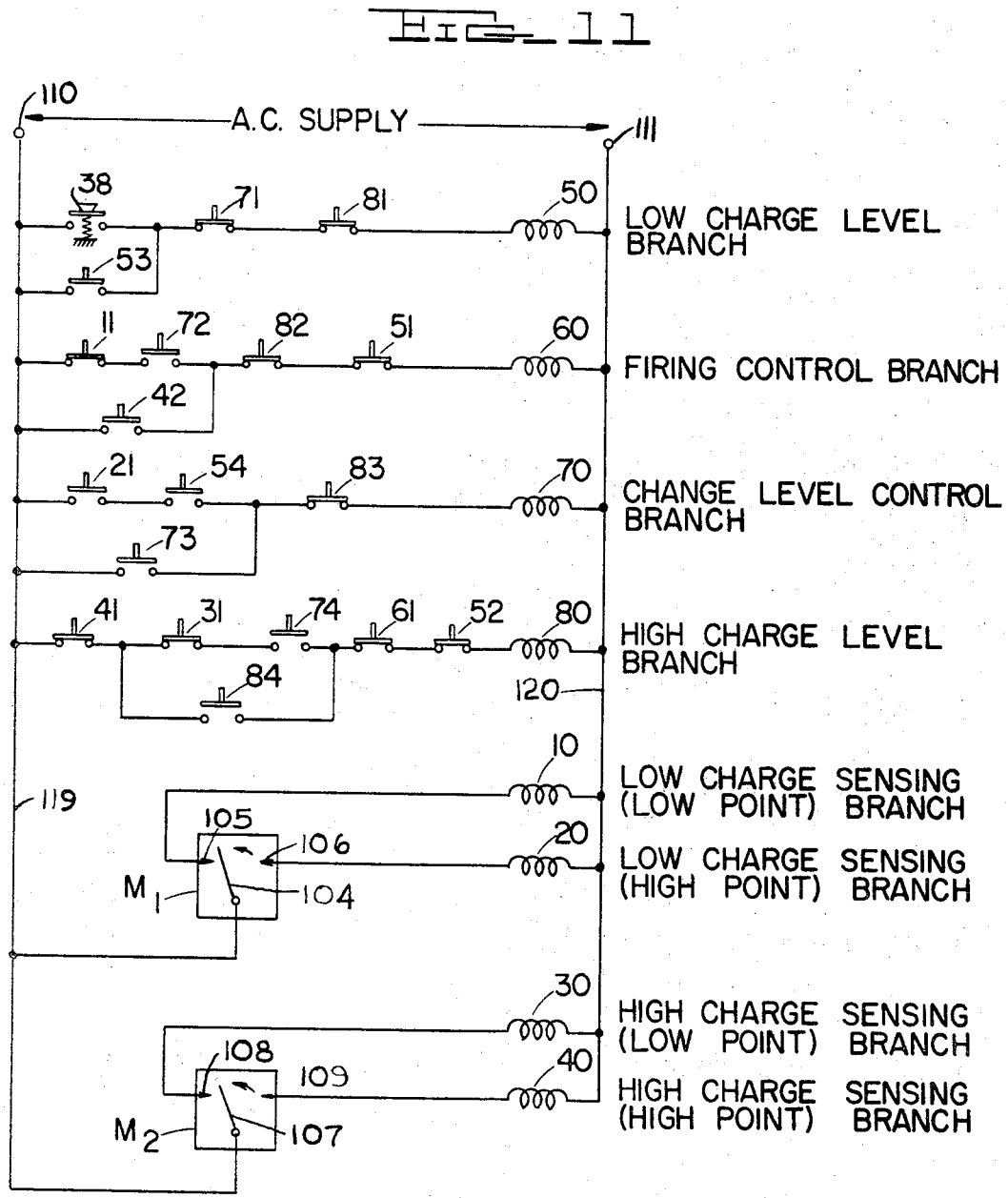

# United States Patent Office 3,407,468
Patented Oct. 29, 1968

3,407,468
APPARATUS FOR ALTERING THE CONFIGURATION OF ELECTRICAL COILS OF INDUCTIVE DEVICES
William E. Baldwin, Fort Wayne, Ind., assignor to General Electric Company, a corporation of New York
Filed Dec. 10, 1965, Ser. No. 513,028
18 Claims. (Cl. 29—205)

ABSTRACT OF THE DISCLOSURE

Apparatus for altering the configuration of electrical coils having an electrical energy surge supply for generating a number of electrical energy surges or pulses of varying magnitudes sequentially in the electrical coils disposed in a load circuit connection station within an enclosure. The supply has a control circuit connected to storage capacitors, with several charge level control circuits included for sequentially coupling variable voltage sources to the storage capacitors for charging them to selected levels. A number of sensing circuits, responsive to these levels, sequentially initiate discharge of the capacitors to the electrical coils for effecting coil-altering or coil transforming operations. Thus, the operator may be effectively protected from possible electrical hazards while the coil alterations are automatically and rapidly being carried out.

Background of the invention

The present invention relates generally to an improved apparatus for altering the configuration of electrical coils. More specifically, it relates to an improved apparatus, suitable for use in the production of electrical motors, that can be used to accomplish various manufacturing operations on electrical coils of a motor, such as the insertion of the turns of the electrical coil into the winding slots, compaction of the conductor turns in the winding slots, pressing back of the end turns of the motor winding, and other coil transforming operations.

In the manufacture of electrical inductive devices, such as magnetic stator cores of fractional horse-power motors, it is necessary that a number of electrical coils be inserted, positioned and packed in the coil accommodating slots of the magnetic core. Conventionally, mechanical devices have been employed to perform the necessary coil transforming operations. U.S. Patents 3,333,327–3,333,300 and 3,333,335, all issued on August 1, 1967 and assigned to the assignee of the present application, new and improved concepts are disclosed for performing various coil transforming operations by the utilization of electrical energy rather than by brute force techniques.

In some applications of these new coil manufacturing concepts, it is necessary to inject a plurality of high energy rate pulses or surges directly into the coils of an inductive device or into a coil inductively coupled with the coil. The supply circuits that produce such high energy rate surges are inherently dangerous to operating personnel since they generally utilize a capacitor bank charged to relatively high voltages which may range from a thousand to 4,000 voltages. Also, when the high energy rate surges are injected in a defective winding, high voltage flashing may occasionally occur that may create hazards to personnel. It is therefore desirable that the injection of the high energy rate surges be carried out at a location remote from operators and under conditions to minimize any electrical hazard to operating personnel. Since it is desirable that the apparatus be adaptable for use in the mass production of inductive devices, it should be, of course, capable of efficient and economical operation and should readily be integrated into a motor manufacturing assembly line.

Summary of the invention

Accordingly, it is a principal object of my invention to provide an improved apparatus for carrying out manufacturing operations on electrical coils or portions thereof.

It is another object of the present invention to provide a safe and efficient apparatus for performing the manufacturing operations on an inductive device, such as, for example, compacting the conductor turns of coils disposed in the slots of a magnetic core and pressing back end turns.

A more specific object of the present invention is to provide an improved apparatus including circuitry, for supplying a plurality of high rate energy pulses to a load circuit coupled with a dynamoelectric machine for effecting manufacturing operations on the coils of the dynamoelectric machine.

It is a more specific object of the present invention to provide an improved apparatus for compacting and pressing back the conductor turns of the coils of a magnetic stator core of an electric motor.

Briefly stated, in accordance with one aspect of the present invention, I have provided an improved apparatus for altering the configuration of at least one coil of an inductive device by the employment of electrical energy. The improved apparatus in one form includes a conveyor means for transporting at least one inductive device from one station to another for effecting various coil transforming operations thereon. Further, the improved apparatus includes a first station means for arranging the inductive device in a load circuit on the conveyor means, a second or work station means including an electrical energy supply means for supplying at least one electrical surge to the load circuit and means for controlling the movement of the conveyor means. The load circuit includes electrical contact members carried by the conveyor means. Stationary output contact members are provided at the second station means for engagement with the input contact members of the load circuit and engaged therewith when the means for controlling the movement of the conveyor means moves the load circuit to the second station means. The input contact members of the load circuit are disengaged from the stationary output contact members of the electrical energy supply means when the load circuit is moved by the conveyor means away from the second station means.

In another aspect of the present invention I have provided a rotatable turntable having a plurality of partitioned sections formed by radially extending partitions of electrical insulating material. The load circuit of the improved apparatus is mounted within a partitioned section allowing an operator to carry out the connections of the inductive device in the load circuit, and the load circuit including the inductive device is transported from the first station means to the second station means by rotating the turntable. Also, I have provided at the second station a canopy that overhangs the partitioned section so that when the partitioned section is rotated into position at the second station means, the canopy and the partitioned section form an enclosure for the load circuit to protect an operator from possible electrical hazards when the energy supply means injects an electrical surge into the load circuit.

Turning now to a further aspect of the present invention, I have provided an improved electrical energy supply means that includes a storage capacitor means, a charging circuit for charging the storage capacitor means to a preselected energy level, a firing circuit for discharging the storage capacitor means, and a control means responsive to the energy levels of the storage capacitor for triggering the firing circuit. When the storage capacitor means is charged to a first preselected level, the control means triggers the firing circuit and discharges the storage capacitor means. The control means is arranged to allow the storage capacitor means to be recharged and trigger the firing circuit when the storage capacitor means is charged to at least a second preselected energy level. In another specific aspect of the invention, I have provided relay contacts arranged initially to couple a first variable voltage source to the charging circuit for charging the storage capacitor means to the first preselected energy level and remove said first variable voltage source and couple a second variable voltage source to the charging circuit to energize the charging circuit during the period that the capacitor storage means is charged to the second preselected energy level.

An important advantage of the improved apparatus is that it is not only simple to operate but is efficient and readily adaptable to mass production techniques in the manufacture of motors and other inductive devices. Other advantages and benefits of the invention will become more apparent as the description proceeds.

The subject matter which I regard as my invention is particularly pointed out and distinctly claimed in the concluding portion of this specification. My invention, however, both as to organization and method of operation, together with further objects and advantages thereof, may be best understood with reference to the following description taken in conjunction with the accompanying drawings.

Brief description of the drawings

FIGURE 2 is a front view in perspective of the improved apparatus showing the arrangement at the load circuit connection station;

FIGURE 3 is an enlarged partial side view at the energy pulse injection station, partly in cross section and broken away to show details, the windings of the motor stator being shown before the electrical surges are discharged through the coils of a magnetic core;

FIGURE 4 is an enlarged view similar to the view shown in FIGURE 3 illustrating details of the load circuit at the electrical surge injection station, the motor stator coils being shown as they appear after two energy surges have been applied to the coils;

FIGURE 5 is a schematic circuit diagram of the energy surge supply circuit embodying another aspect of my invention;

FIGURE 6 is a simplified schematic diagram of the relay coil control portion of the electrical surge supply circuit showing the control relay contacts and meter relays for the standby condition of the circuit;

FIGURE 10 is a simplified schematic circuit diagram of the relay coil control portion of the electrical surge supply circuit showing the control relay contacts and meter relays for the high level charge firing condition of the circuit; and FIGURE 11 is a simplified schematic circuit diagram of the relay coil control portion of the electrical surge supply circuit showing the control relay contacts and the meter relays for the high level charge condition.

Description of the preferred embodiment

Figure 1:
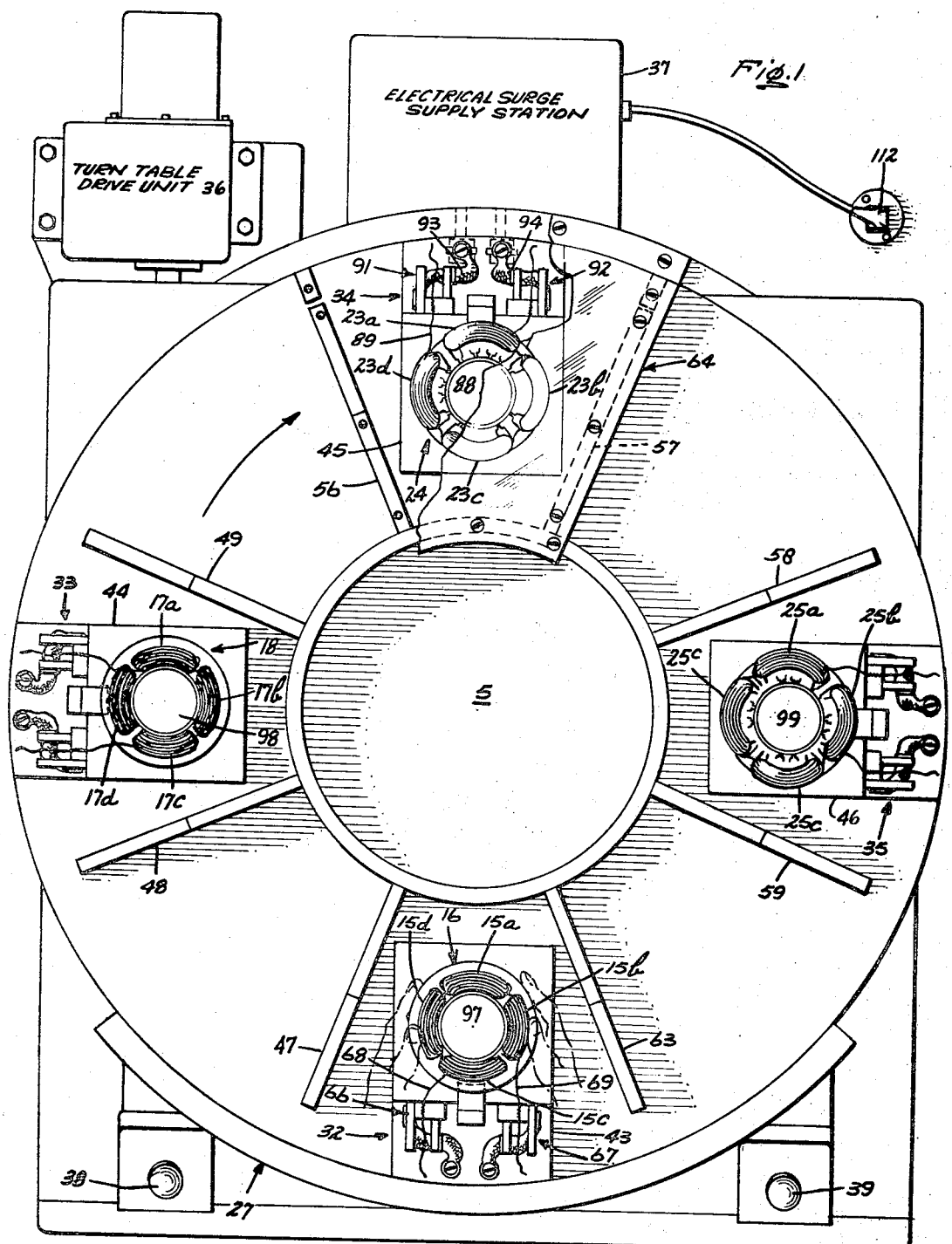
FIGURE 1 is a plan view of the improved apparatus of my invention with the plastic glass enclosure at the electrical surge injection station being broken away to show the connections and motor stator arrangement at this station.
Figure 7:
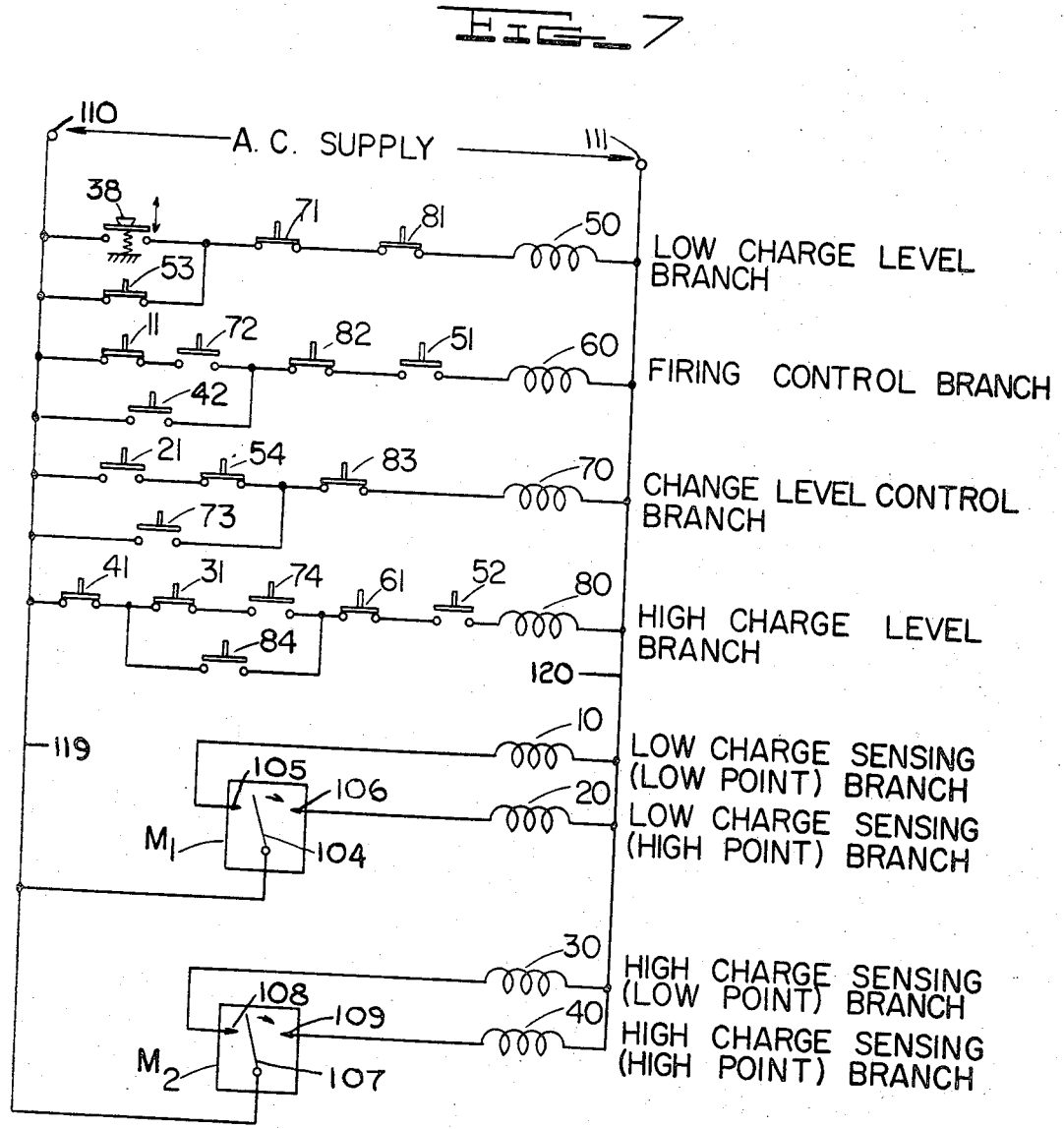
FIGURE 7 is a simplified schematic circuit diagram of the relay coil control portion of the electrical surge supply circuit showing the control relay contacts and the meter relay contacts for the low level charge condition.

Having more specific reference now to FIGURES 1 through 4, I have illustrated therein an improved apparatus 5 embodying one form of my invention for altering the configuration of coils 15a, 15b, 15c and 15d of a magnetic stator core 16 of a fractional horsepower motor (not shown) and coils 17a, 17b, 17c and 17d of a stator core 18, the coil transforming operation having been completed on coils 23a, 23b, 23c and 23d of a stator core 24 and on coils 25a, 25b, 25c and 25d of a stator core 26. In the illustrated exemplification of my invention, the improved apparatus 5 includes a conveyor or other transporting means, for instance, turntable 27, four load circuits 32, 33, 34 and 35, a turntable drive unit 36, an electrical surge supplycircuit enclosed in a housing 37, a surge supply circuit enclosed in a housing 37, a surge supply circuit pushbutton switch 38 a turntable indexing switch 39, and fixtures 43, 44 and 45 for supporting the motor stator cores 16, 18, 24 and 26.

The turntable 5 is fabricated of electrically insulating material such as fibre glass or a phenolic plastic such as Bakelite. It will be noted that the turntable 5 is provided with eight upstanding radially extending partitions 47, 48, 49, 56, 57, 58, 59 and 63 defining eight partitioned sections, four of which contain the load circuits 32, 33, 34 and 35. At the electrical surge supply station a canopy 64 overhangs the partitioned section formed by partitions 56 and 57 to provide an enclosure for the load circuit at this station. Preferably, the canopy 64 is made of transparent insulating material to permit visual observations to be made of the stator core at the work or electrical surge supply station. It will be understood, of course, that the enclosure protects the operator against possible injury in the event that a coil shorts out or some other mishap occurs at the electrical surge supply station.

It will be seen that at the load circuit connection station a foot pedal 65 is provided to allow the operator to open the left and right connectors 66 and 67 (FIGURE 1) so that the left and right leads 68 and 69 of the stator winding can be quickly connected or coupled in the load circuit 32. As is best seen in FIGURE 4 a connector, only one of which is shown, consists of a fixed jaw 75 and a movable jaw 76. The movable jaw 76 is biased by a spring 77 into engagement with the fixed jaw 75. A pusher rod 78 attached to the movable jaw 75 extends downwardly from the turntable 27. When the foot pedal 65 is depressed at the load circuit connection station, the pusher rod 78 is actuated by a pneumatic piston 79 (shown in phantom outline) located at the load circuit connection station and the movable jaws 76 are moved vertically upward to open the connectors. With the jaws 75, 76 in the open position, the lead wires from the stator winding are inserted between the jaws 75, 76 and when in place the operator takes his foot off the foot pedal 65.

In the illustrative exemplification of my invention the lead wires of a stator winding are connected to the connectors of a load circuit at the load circuit connection station where as yet there is no electrical connection between the load circuit and the electrical surge supply circuit. An electrical connection between the electrical surge supply circuit and the lead wire is established only when the load circuit with the stator winding connected therewith is transported to the electrical surge supply station. At each partitioned section of the turntable 27 the connectors of each load circuit are joined electrically with input contact members 86 which extend vertically downward underneath the turntable 27. These pronged contact members 86, two of which are associated with each load circuit, engage a pair of stationary output contact members 87 which extend vertically upward underneath the turntable 27 at the electrical surge supply station. Thus, at the electrical surge supply station an electrical connection is established between the electrical surge supply circuit and the load circuit. In the illustrative exemplification of my invention, the load circuit shown at the electrical surge supply station includes a cylindrical member 88, the magnetic core 24, the coils 23a, 23b, 23c and 23d, the lead wires 89, 90, leads 93, 94, the input contact members 86 and the output contact members 87. As is shown in FIGURES 3 and 4, the output contact members, only one of which can be seen, are connected to output leads 95, 96 of the electrical surge supply circuit. It will be noted that the other load circuits 32, 33 and 35 also include a cylindrical member 97, 98 and 99 respectively. These cylindrical members are made of electrically conductive non-magnetic material, such as copper, and produce a repulsive effect in the conductor turns when the coils are pulsed. Referring again to FIGURES 3 and 4, it will be seen that a cardboard tube 100 is provided between the bore of the stator 24 and the cylindrical member 88. It will be appreciated that the tube 100 was inserted in the bore after the coil insertion operation to prevent conductor turns from falling out of the stator slots. Preferably, these tubes may be left in place while the coils are being pressed back and compacted in the improved apparatus 5 of my invention. When turntable 27 is indexed to transport the load circuit 33 (see FIGURE 1) to the electrical surge supply station, the load circuit 33 is connected with the electrical surge supply circuit as the input contact members underneath the turntable 27 engage the stationary contact members of the energy surge supply circuit. As the turntable is indexed, the contact members of the load circuit moving away from the electrical surge supply station become disengaged from the stationary contact members of the electrical surge supply circuit.

In the illustrated exemplification of the invention the turntable 27 is rotated in a clockwise direction through 90 degrees when the operator depresses the index switch 39. Any number of well-known power drive systems such as a gear motor or pneumatic motor, may be employed to drive the turntable 27. As will be seen in FIGURE 1, the index switch 39 is conveniently located at the right side of the operator. Although in the specific embodiment of my invention I have shown a turntable 27 with four load circuits, it will be appreciated that the apparatus of my invention can be readily equipped with additional load circuits.

Before proceeding with a more detailed description of the energy surge supply circuit, I will now describe the overall operation of my improved apparatus and the various steps performed by the operator in carrying out my invention. Referring again to FIGURE 1, which illustrates the apparatus 5 with four stators in place, it will be seen that the operator has just placed a stator core 16 in position so that the cylindrical member 97 extends through the stator bore. With the stator core 16 in position, the operator then depresses the foot pedal 65 to open up the jaws of the connectors 66, 67, inserts the lead wires 68, 69 into the jaws and takes his foot off the foot pedal 65 to make a connection therewith. Having completed this step, he depresses the index button 39 to rotate the turntable 90 degrees and bring a completed stator to the load circuit connection station. Also, at the same time a motor stator previously connected is rotated to the electrical surge discharge station. When the turntable 27 stops, the operator depresses the pushbutton switch 38 to initiate the operation of the electrical surge supply circuit. The operator again depresses the foot pedal 65 to open the jaws of the connectors in order to disconnect the lead wires of the winding of the stator core which has just been transported to the load circuit connection station. The stator core is removed from the cylindrical member and is placed on a conveyor or other transporting means so that the motor stator can be moved to another location where other manufacturing operations can be carried out on the stator core. The operator places another motor stator requiring coil transforming operations on the cylindrical member and depresses the foot pedal 65 to connect the main winding of this stator core in the load circuit. During this period, the electrical surge supply circuit has injected a first and a second surge of electrical energy into the coils. The first surge of electrical energy effects a press back of the conductor turns into the slots at an energy level sufficient to effect the movement of the wires without shorting conductors adjacents to the uninsulated parts of the stator core. The second surge of electrical energy effects a compaction of the conductors in the stator slots and brings about the desired pressback of the end turns.

Normally the removal of the stator from the load circuit at the load circuit connection station and the placement of a new stator core should require no more time than is required to inject the two surges successively through the stator winding at the electrical surge supply station. Accordingly, by the time the operator has positioned and secured a new stator core in the load circuit the coil transforming operations on the coils of the motor stator at the electrical surge supply station will have been completed, and the operator can press the index pushbutton 39 to again rotate the turntable 27 through 90 degress and to commence another cycle of operation.

Having more specific reference now to FIGURES 5 to 11, I will now more fully describe the electrical surge supply circuit which forms another aspect of my invention. In the illustrated exemplification of the invention the electrical surge supply circuit is adapted to inject a first surge of electrical energy into the stator winding by discharging a capacitor bank consisting of capacitors $C_1$, $C_2$ and $C_3$, charged to a preselected voltage level, charging the capacitor bank to a second preselected level, and discharging the capacitor bank to inject a second surge of electrical energy. It was found that a first preselected low level charge of about 1,000 volts and a high level charge of 2,000 volts was sufficient to provide the desired alterations in the configuration of the coils. The energy level which must be injected into the winding will depend upon a number of factors such as the wire size, the overall geometry of the coils, the type of wire insulation, and the configuration of the cylindrical member of the load circuit.

The high energy rate surges or pulses are obtained by discharging a capacitor bank consisting of the capacitors $C_1$, $C_2$, and $C_3$. The energy levels of the capacitor bank is sensed by two meter relays $M_1$ and $M_2$. The signal coils 102, 103 of the meter relays $M_1$, $M_2$ are connected in series wtih resistors $R_1$ and $R_2$, respectively, and with ground G thereby placing the serially connected relay meter $M_1$ and resistor $R_1$ and the serially connected meter relay $M_2$ and resistor $R_2$ in parallel with each other across the capacitor bank. The resistors $R_1$ and $R_2$ are used to reduce the current flow through the meter relays $M_1$ and $M_2$ to signal current values.

As will hereinafter be more fully explained, the relay meter $M_1$ was adjusted to establish the low charge level to which the capacitor bank is charged while relay meter $M_2$ is adjusted to establish the high charge level. The meter relay $M_1$ has a high and a low limit setting. The low limit (low voltage) setting is reached when the meter pointer 104 engages contact 105 while the high limit (high voltage) setting of meter relay $M_1$ is reached when the voltage charge on the capacitor bank reaches a preselected high level wherein the meter pointer 104 engages the meter contact 106. Similarly, the engagement of the meter pointer 107 with meter contacts 108 and 109 determines the low and high limits of meter relay $M_2$. In accordance with one aspect of my invention low limit of meter relay $M_1$ is set slightly higher than the lower limit of the meter relay $M_2$ to insure that during the capacitor discharge cycle contact 105 is engaged by meter pointer 104 an instant before meter pointer 107 engages contact 108 to allow the high charge level branch of the control circuit to become energized after the initial discharge. I will hereinafter more fully describe how this is accomplished. Also, it should be noted that the high limit of meter relay $M_2$ is set considerably higher than the high limit setting of meter relay $M_1$, since the high limit setting of meter relay $M_2$ determines the energy level to which the capacitor bank is charged.

As will be seen in FIGURE 5, input terminals 110, 111 are connected with a standard three-conductor cord having a three pronged plug 112 for insertion in a standard grounded type receptacle of a 120 volt, 60 cycle power source. In the interest of simplification, I have not shown in the schematic circuit diagram of FIGURE 5 a time delayed on-off switch arrangement which is normally used in circuits utilizing hot-cathode mercury rectifiers to insure that the cathodes of the rectifiers $D_1$, $D_2$ and $D_3$ are heated before plate voltage is applied. It will be understood, of course, that the primary windings $P_4$, $P_5$ of the filament transformers $T_4$, $T_5$ must be energized for a fixed interval of time (about 30 seconds) before the charging circuit is energized to allow the cathodes of the rectifiers $D_1$, $D_2$ and $D_3$ to warm up. A suitable circuit arrangement for insuring that this time delay is provided is shown in the Raymond G. Rushing co-pending U.S. patent application Ser. No. 414,826 filed on Nov. 30, 1964, now Patent No. 3,333,328 and assigned to the same assignee as the present invention.

An electrical energy surge is provided at the output terminals 95, 96 by switching an ignitron $S_1$ into conduction when the capacitor bank $C_1$, $C_2$ and $C_3$ is charged to a predetermined level. The second ignitron $S_2$ is utilized to suppress large oscillatory voltages that might shorten the life of the capacitors $C_1$, $C_2$ and $C_3$. When a damped oscillatory condition occurs, the polarity of the voltage across the output terminals 95, 96 reverses to cause the voltage on the plate of rectifier $D_1$ to become positive and rectifier $D_1$ conducts thereby causing a positive potential to be applied at the starter rod 114 of ignitron $S_2$. Ignitron $S_2$ is fired and provides a path for reverse current flow which shunts the capacitor bank $C_1$, $C_2$ and $C_3$. Ignitrons $S_1$ and $S_2$ used in the exemplification of the of the invention were mercury-pool cathode-arc rectifiers with starter rods 113, 114 respectively immersed in a mercury pool. When a positive potential is applied at a starter rod of an ignitron, sparking occurs at the junction of the rod and mercury pool causing a cathode spot to form, and the ignitron is switched into conduction.

It will be seen from the schematic circuit diagram shown in FIGURE 5 that two parallel-connected variable control autotransformers $T_1$ and $T_2$ control the voltage applied across the primary winding $P_3$ of a transformer $T_3$. In order to limit the peak current in the primary winding $P_3$, a choke $L_1$ is provided in series with the primary winding $P_3$. To provide a full-wave rectified current for charging the capacitors $C_1$, $C_2$, and $C_3$, a pair of high voltage rectifiers $D_2$ and $D_3$ are connected across the secondary winding $S_3$ in a well-known full-wave rectifier configuration. The full-wave rectified output is brought out at the center tap 116 of the secondary winding $S_3$. The rectifiers $D_2$ and $D_3$ alternately conduct as the polarity of the input voltage across the primary winding $P_3$ changes.

A capacitor $C_4$ in the firing circuit of ignitron $S_1$ is also charged during the operating condition of the capacitor discharge circuit through a voltage divider consisting of resistors $R_3$ and $R_4$. Two leads 117, 118 are brought out from the firing circuit to control relay $CR_6$. When contacts 62 are closed, capacitor $C_4$ is discharged to provide a positive signal at the starter rod 113 of ignitron $S_1$. A resistor $R_5$ is connected in the firing circuit $C_4$ in order to control the discharge rate of the capacitor $C_4$.

As is shown in FIGURE 5, the electrical surge supply circuit consists of a control circuit portion and a capacitor discharge circuit portion, the supply lines 119, 120 being shown as heavy lines. The control circuit portion includes meter relays $M_1$, $M_2$, relays $CR_1$, $CR_2$, $CR_3$, and $CR_4$, which are controlled by the relay meters $M_1$ and $M_2$, and four additional control relays $CR_5$, $CR_6$, $CR_7$, and $CR_8$.

It will be seen in FIGURE 5 that the control portion of the circuit is coupled with the capacitor discharge circuit by means of the signal coils 102, 103 of meter relays $M_1$ and $M_2$, relay contacts 62 and relay contacts 55 and 85. Signal coil 102 of meter relay $M_1$ is used in the low charge level branch of the control circuit while signal coil 103 of meter relay $M_2$ comes into play to sense the high charge level of the capacitor bank. During the standby condition the filament transformers $T_4$ and $T_5$ are energized and the cathodes of the rectifiers $D_1$, $D_2$, and $D_3$ are heated. However, the primaries $P_1$, $P_2$, $P_3$ of the variable transformers $T_1$, $T_2$, and transformer $T_3$ are not energized. Since there is no current flow in the capacitor discharge portion of the circuit, the meter pointers 104, 107 on the meter relays $M_1$ and $M_2$ will be in the low limit positions wherein meter pointer 104 engages contact 105 and the meter pointer 107 engages contact 108. The coils 10 and 30 of control relays $CR_1$ and $CR_3$ are energized because in the standby condition the low limit switches (meter pointer 104, contact 105 and meter pointer 107, contact 108) are closed and coils 10, 30 are connected across the supply lines 119, 120. In the standby condition the electrical surge supply circuit is ready to be energized by depressing the pushbutton switch 38.

It should be noted that the relay contact 62 is normally open and that to fire the ignition $S_1$ control relay coil 60 has to be energized. Control relay contacts 55 of the control relay 5 are normally open and when closed cause the voltage of the autotransformer $T_1$ to be applied across the primary winding $P_3$ to start the low level charge condition. For the high level charge condition relay contacts 85 of the control relay 8, which are normally open, apply the voltage of the autotransformer $T_2$ across the primary winding $P_3$ of transformer $T_3$ to start the high level charge condition of the circuit.

By way of a more specific illustration of an energy surge supply circuit used in the practice of the invention, the following identified components may be used in the circuit illustrated in FIGURE 5, as are particularly identified below:

| Component identification: | Specification of the components |
| --- | --- |
| Variable autotransformers $T_1$, $T_2$ | General Electric 9H60LA10K. |
| Transformer $T_3$ | Stancor P–8034. |
| Rectifiers $D_1$, $D_2$, $D_3$ | Mercury Vapor 872A. |
| Filament transformer $T_4$ | Stancor 5 volt, 15 ampere, P6433. |
| Filament transformer $T_5$ | Stancor 5 volt, 10 ampere, P6135. |
| Ignitrons $S_1$, $S_2$ | GL–5550. |
| Capacitors $C_1$, $C_2$, $C_3$ | 210 microfarads, 5 kv. |
| Capacitor $C_4$ | .05 microfarad, 3000 volts. |
| Choke $L_1$ | Stancor C2688. |
| Resistors $R_1$, $R_2$ | 5 megohms, 5 watts. |
| Resistor $R_3$ | 3 megohms. |
| Resistor $R_4$ | 2 megohms. |
| Resistor $R_5$ | 10 ohms, 10 watts. |
| Meter relay $M_1$ | Assembly Products, Inc. |
| Control relays $Cr_1$, $CR_2$ | Optical meter relay. |
| Meter relay $M_2$ | Assembly 0–1 milliampere range. |
| Control relays $CR_3$, $CR_4$ | Double set point. |

Having more specific reference now to the simplified schematic circuit diagrams as shown in FIGURES 6 through 11, I will now more fully describe the operation of the control circuit portion. In FIGURE 1 I have illustrated a simplified schematic diagram for the standby condition of the control circuit portion. The simplified schematic diagram includes all of the relay contacts in the circuit shown in FIGURE 5 with the exception of those that are in the capacitor discharge circuit portion, relay contact 55, relay contact 85, and relay contact 62.

In all of the simplified circuit diagrams shown in FIGURES 6 through 11 the control circuit portion includes eight branches which I have identified in the drawings as the low charge level branch, firing control branch, change level control branch, high charge level branch, low charge sensing (low point) branch, low charge sensing (high point) branch, high charge sensing (low point) branch, and the high charge sensing (high point) branch.

In the standby condition of the circuit shown in FIGURE 6 the meter relays $M_1$ and $M_2$ are at their low point positions with the meter pointers 104, 107 engaging the contacts 105, 108 thereby placing the coils 10 and 30 across the alternating current supply lines 119, 120. Except for the relay contacts 11 which appear in the firing control branch of the control circuit and relay contacts 31 which are in the high charge branch, all of the other relay contacts are in their normal positions.

As will be seen in FIGURE 6, the low charge level branch includes pushbutton switch 38, relay contacts 71, relay contacts 81, and relay coil 50 connected in series across the alternating current supply. Contacts 53 are connected in shunt across pushbutton switch 38 so that when the pushbutton switch 38 is momentarily depressed by the operator, relay coil 50 is energized to close the normally open relay contacts 53. Relay coil 50 will remain energized until either of the normally closed relay contacts 71 or 81 are opened. With relay coil 50 energized, it will be appreciated that relay contacts 55 connect the autotransformer $T_1$ across the power supply and transformer $T_3$ of the capacitor discharge circuit is energized.

Turning now to the firing control branch, this branch circuit includes three normally closed relay contacts 11, 82 and 51 in series with relay coil 60 across the alternating current supply. It will be noted that relay contacts 11 as shown in FIGURE 5 are in the open position since relay coil 10 is energized during the standby condition. Relay contacts 42 are connected in shunt with contacts 11 and 72 and are actuated by meter relay $M_2$ when the meter pointer 107 reaches the high point position. Thus relay contacts 42 come into play to energize coil 60 during the high level charge firing condition of the circuit. When relay coil 60 is energized, it will be appreciated that relay contacts 62 connected in series with starter rod of the ignitron $S_1$ are closed and the ignitron $S_1$ is triggered into conduction. Relay coil 60 is energized at the end of the low level charge period through a path which includes the four relay contacts 11, 72, 82 and 51. The normally closed relay contacts 82 and 51 are provided in the firing control branch to insure that the relay coil 60 is not energized during either the high level or the low level charging periods of the capacitor discharge circuit.

Referring now more particularly to the charge level control branch, it will be seen that this branch includes a normally open relay contact 54, a normally closed relay contact 21, and one set of normally closed relay contacts 83 in series with control winding 70. Also, the normally open relay contacts 73 are connected in shunt with relay contacts 21 and 54. As will hereinafter be more fully explained, the change level control branch circuit comes into play only during the low level charge firing condition and implements the start of the high level charge cycle.

The high charge level branch circuit includes one set of normally open contacts 74 and four normally closed relay contacts in series with relay coil 80 across the alternating current supply, and relay contacts 84 are connected in shunt across the relay contacts 31 and 74. It will be noted that, as shown in FIGURE 6, relay contacts 31 are in the open position because relay coil 30 is energized in the standby condition. Relay contacts 31 serve to disconnect the high charge level branch from the power supply when the capacitor bank is charged up to a preselected high level. The manner in which this is accomplished will be more fully described in connection with the description of the high level of charge condition of the circuit. Relay contacts 61 function as a momentary switch to initiate the high level charge start condition, and relay contacts 84 provide a shunt path around the relay contacts 31 and 74 during the high level charge condition. In order to insure that the high charge level branch circuit is not energized while the low charge level branch is energized, the normally closed contacts 52 are placed in series with relay coil 80.

In order to more fully explain the operation of the control circuit I will now describe the various control conditions of the circuit as are shown in FIGURES 6 to 11. Let us assume that the operator depresses the pushbutton 38, the control circuit portion being in the standby condition as shown in FIGURE 6. Relay coil 50 of the low charge level branch is energized and relay contacts 55 are actuated (see FIGURE 5) to a closed position to connect the autotransformer $T_1$ across supply lines 119 and 120 thereby applying a voltage of preselected magnitude across the primary winding $P_3$ of transformer $T_3$. The capacitor bank is now being charged and the pointers 104 and 107 have been moved away from their low point position out of engagement with contacts 105 and 108 and are shown in an intermediate position. Relay coils 10 and 30 are now de-energized. As a result, relay contacts 11 in the firing control branch and relay contacts 31 in the high charge level branch are closed. The only branch circuit energized during the low level charge condition is the low charge level branch. With relay coil 50 energized, it will be seen that relay contacts 51 in the firing control branch are open, relay contacts 54 in the charge level control branch are closed, and the relay contacts 52 in the high charge level branch are open.

Figure 8:
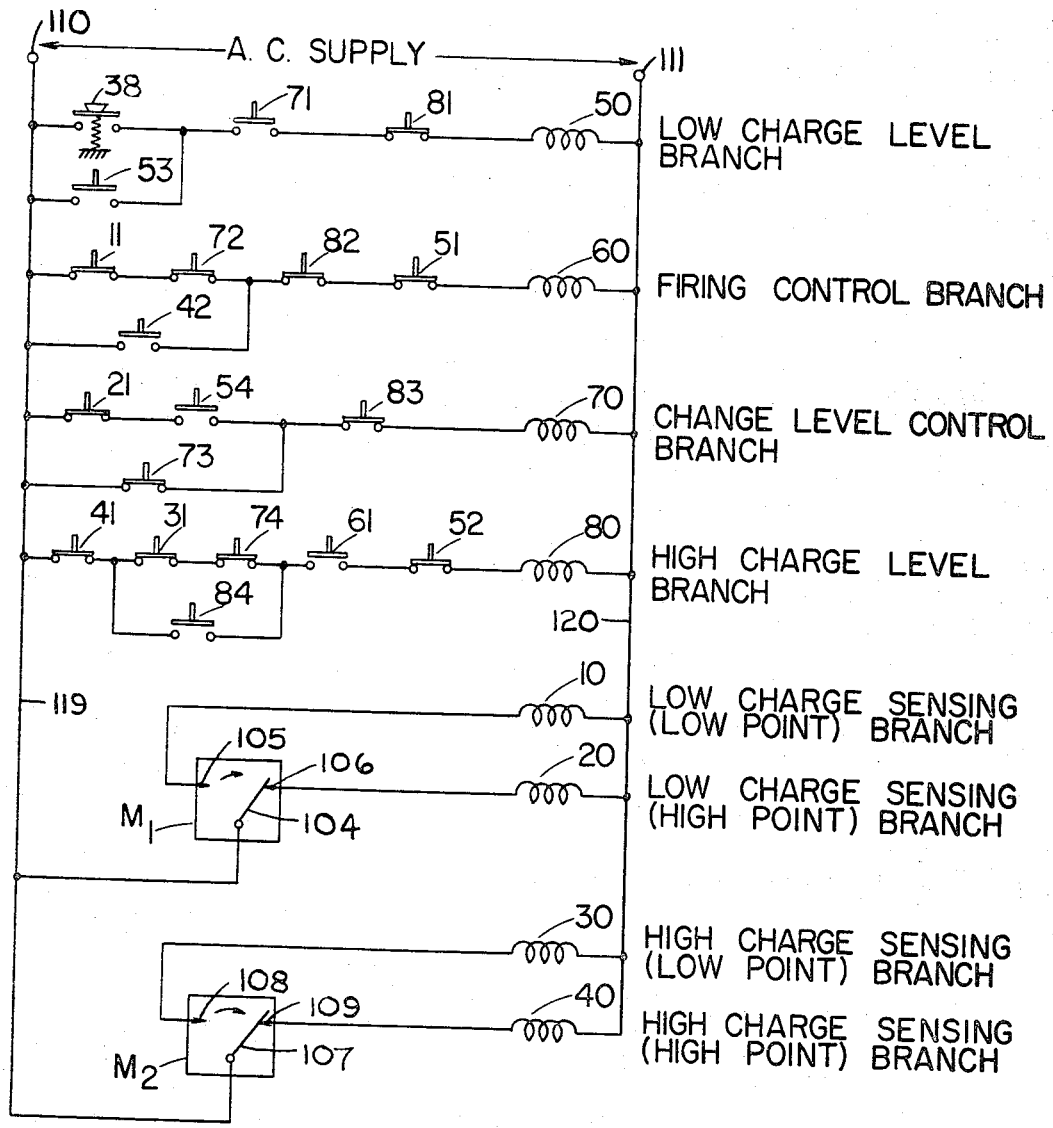
FIGURE 8 is a simplified schematic circuit diagram of the relay coil control portion of the electrical surge supply circuit showing the control relay contacts and the meter relays for the low level charge firing condition.

When the capacitor bank reaches a preselected low level charge, the pointer 104 of the meter relay $M_1$ engages contact 106. As is shown in FIGURE 8, with the pointer 104 now in this position, relay coil 20 is energized. Control relay $CR_2$ actuates contacts 21 to energize the change level control branch, and with current flowing through the relay coil 70 relay contacts 71 are actuated to the open position thereby disconnecting relay coil 50 from the power supply circuit. Relay contacts 51 in the firing control branch are closed and accordingly, current now flows through the relay coil 60 and control relay $CR_6$ is actuated to close relay contacts 62 in the firing circuit to fire ignitron $S_1$ and discharge the capacitor bank. It will be noted that in the change level control branch, relay contacts 54 have been actuated to an open position and relay contacts 73 have been actuated to a closed position. In the high charge level branch, contacts 74 are closed, contacts 61 are opened, and relay contacts 52 are closed.

Figure 9:
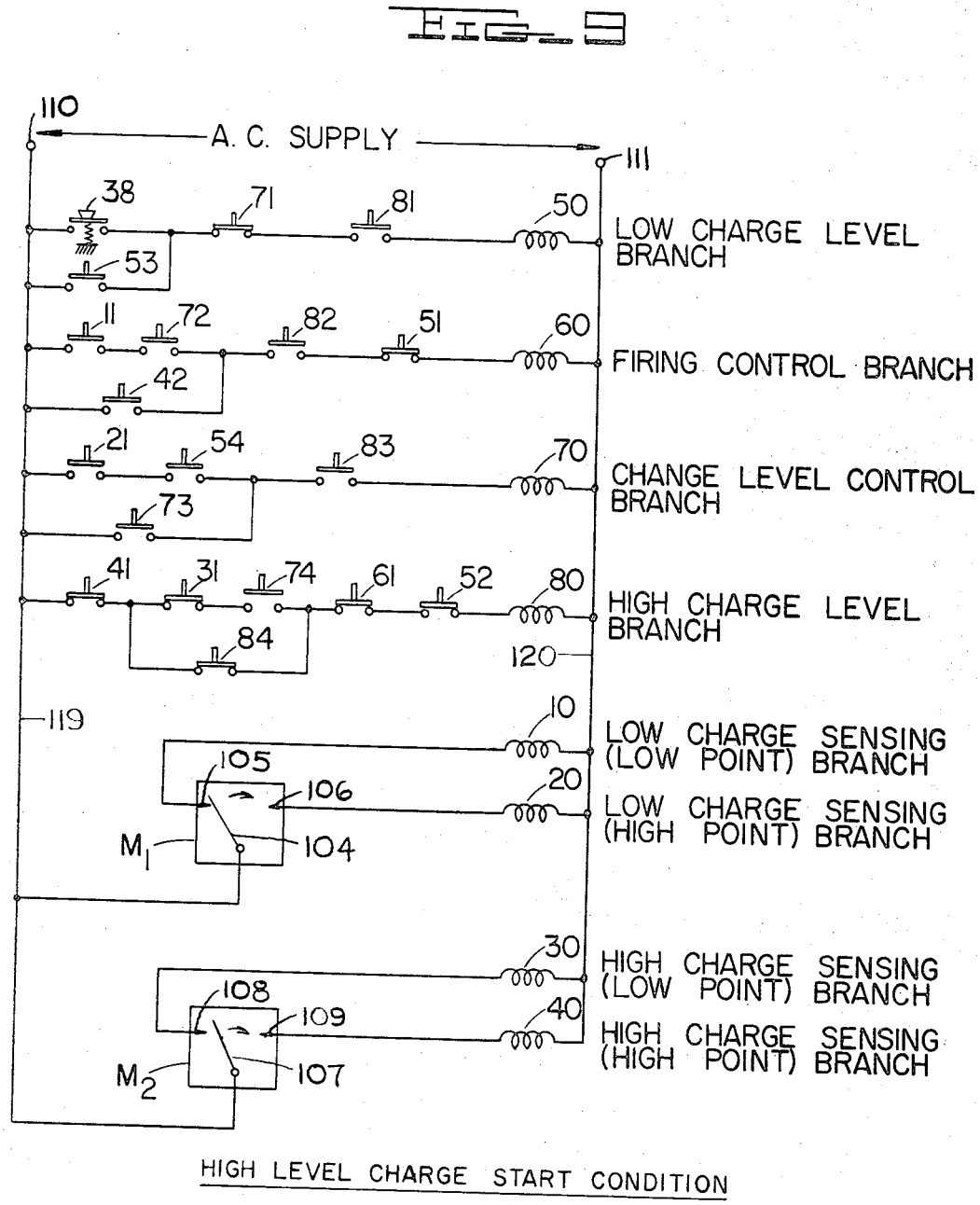
FIGURE 9 is a simplified circuit diagram of the relay coil control portion of the electrical surge supply circuit showing the control relay contacts and meter relays for the high level charge start condition of the circuit.

When the capacitor bank discharges, the voltage drops quickly and the pointer 104 of the meter relay $M_1$ falls to the low point limit position to engage the low limit contact 105 and energize coil 10. It will be appreciated that the low limit setting of meter relay $M_1$ is slightly greater than the low limit setting of the meter relay $M_2$. Thus the pointer of the relay meter $M_2$ does not engage low limit contact 108 until an instant after the pointer 104 of meter relay $M_1$ engages its low limit contact 105. With relay coil 10 energized the control circuit is in the high level charge start condition as shown in FIGURE 9. Relay $CR_1$ actuates relay contacts 11 to the open position thereby opening the firing control branch circuit to de-energize relay coil 60. Control relay $CR_6$ actuates relay contacts 61 in the high charge level branch to energize relay coil 80 thereby closing shunt relay contacts 84 and also closing contacts 85 (see FIGURE 5) to cause the voltage across variable transformer $T_2$ to be applied across primary winding $P_3$ of transformer $T_3$.

The capacitor bank is now being charged and when the voltage across the capacitor bank reaches a preselected high level, both pointers 104, 107 of meter relays $M_1$ and $M_2$ will be in the high limit position as shown in FIGURE 10. Relay coils 20 and 40 are now energized. Relay contacts 41 are opened in the high charge level branch to de-energize relay $CR_8$ thereby opening contacts 85 to cut off the power supplied to the capacitor discharge circuit. Also, relay contacts 42 and 82 are closed in the firing control branch to discharge the capacitor bank.

In FIGURE 11 I have shown the control relays for the high level charge condition of the circuit. During this condition the capacitors are discharging but the voltage across the capacitor bank has not yet fallen down to zero. It will be seen that relay coils 20, 40 and 60 are de-energized, and relay contacts 62 in the firing circuit of ignitron $S_1$ are opened. When the voltage drops down to zero, the pointers 105, 107 of the meter relays $M_1$ and $M_2$ will be at their low point positions, and the control circuit will revert to the standby condition. The control cycle can be repeated by depressing the pushbutton switch 38. The improved apparatus can be readily operated by one operator. Standing at the load circuit connection station, the operator can observe the load circuit at the electrical surge injection station while connecting the stator core in the load circuit.

From the foregoing description of the improved apparatus exemplifying my invention, it will be apparent that various operations can be efficiently and safely carried out on inductive devices such as the stator cores of small electrical motors and other coil accommodating members. Although in the exemplifications of my invention, the high energy rate pulses were injected into the coils of the main stator winding, it will be appreciated that various coil transforming operations, such as coil shaping, pressing, compacting and placing operations, as may be required in the process of the manufacture of an inductive device can be accomplished without necessarily connecting the coil itself to the electrical surge supply circuit. For example, the coils on which the coil transforming operations are to be performed can be inductively coupled with a coil that, like the coils of the inductive device, forms part of the load circuit on the turntable. Further, it will be appreciated that although the improved apparatus was illustrated in connection with a supply circuit producing two high rate energy pulses by discharging a capacitor bank, it will be apparent to those skilled in the art that the apparatus may be modified to produce more than two surges and that other than a capacitor discharge circuit may be used.

While I have shown and described one embodiment of my invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. An apparatus for effecting coil transforming operations on at least one coil of a magnetic core member, said apparatus comprising: a conveyor means for transporting the coil and magnetic core member from one station to another, a plurality of load circuits on said conveyor means, each of said load circuits having input contact members, a first station means for arranging said coil and magnetic core member in at least one of said load circuits, a second station means including an electrical surge supply means for supplying at least one electrical surge to the load circuit for effecting a coil transforming operation on the coil of the magnetic core member in the load circuit located at said second station means, means for controlling the movement of the conveyor means between said first and second station means, input contact members of at least one of said load circuits becoming engaged with the output contact members of the electrical surge supply circuit when the conveyor means moves a load circuit in position at said second station and the input contact members of the load circuit located at said second station being disengaged from said output contact members when the load circuit at the second station is moved away from said second station.

2. The apparatus as set forth in claim 1 wherein said conveyor means is comprised of a rotatable turntable and said first and second stations are located at diametrically opposite sides of said turntable, and an enclosure located at said second station with at least a portion thereof formed of transparent insulating material to permit an operator at said first station to observe the load circuit positioned at said second station.

3. The apparatus set forth in claim 1 wherein said conveyor means includes a turntable with a plurality of radially extending partitions defining partitioned sections, the said load circuits being contained in at least some of said partitioned sections, said second station including a canopy overhanging the one of said partitioned sections positioned by the turntable at said second station, said partitioned section and said canopy forming an enclosure for the load circuit contained in said one of the partitioned sections positioned at said second station.

4. The apparatus set forth in claim 1 wherein said electrical surge supply circuit comprises a storage capacitor means; a charging circuit for charging said storage capacitor means to preselected energy levels; a firing circuit for discharging said storage capacitor means; a first variable voltage source; a second variable voltage source; a control circuit including a low charge level control circuit means arranged initially to couple said first variable voltage source to said charging circuit for charging the storage capacitor means to a first preselected energy level, a high charge level control circuit arranged to couple said second variable voltage source to said charging circuit to energize said charging circuit for charging the storage capacitor means to a second preselected energy level, a low charge sensing circuit means responsive to the energy level of said storage capacitor means and effecting the actuation of a relay for controlling said firing circuit and discharging said storage capacitor means when said storage capacitor means is charged to said first preselected level to inject a first electrical surge in the load circuit, and a high charge sensing circuit means responsive to the energy level on said storage capacitor means and effecting the actuation of a relay controlling said firing circuit for triggering said firing circuit and discharging said storage capacitor means when said storage capacitor means is charged to a relatively higher preselected energy level thereby to inject a second electrical surge into the load circuit at said second station.

5. An apparatus for altering the configuration of at least one coil of an inductive device by the use of electrical energy, said apparatus comprising: conveyor means for transporting at least one inductive device from one station to another for effecting a coil-transforming operation thereon, a first station means for arranging said inductive device in a load circuit carried on said conveyor means, said load circuit having electrical input contact members carried by said conveyor means, a second station means including an electrical surge supply means for supplying a plurality of electrical surges to the load circuit for effecting said coil-transforming operation on said coil, said electrical surge supply means including stationary output contact members, means for controlling the movement of the conveyor means between said first and second station means, said input contact members engaging said stationary output contact members of said electrical energy supply means when said load circuit is moved on said conveyor means to said second station means, and said input contact members of the load circuit becoming disengaged from said stationary output contact members of said electrical energy supply means when said load circuit is moved by the conveyor means away from said second station means.

6. The apparatus set forth in claim 5 wherein said conveyor means includes a rotatable turntable and said first and second stations are located at diametrically opposite sides of said turntable, and said second station includes an enclosure with at least a portion thereof formed of transparent insulating material to permit an operator at said first station to observe the load circuit positioned at said second station.

7. The apparatus set forth in claim 5 wherein said conveyor means includes a turntable with a plurality of radially extending partitions defining partitioned sections, said additional load circuits being contained in at least some of said partitioned sections, said second station including a canopy overhanging the one of said partitioned sections positioned by the turntable at said second station, and said partitioned section and said canopy forming an enclosure for the load circuit contained in said one partitioned section.

8. The apparatus set forth in claim 5 wherein said electrical surge supply means comprises a storage capacitor means; a charging circuit for charging said storage capacitor means to preselected energy levels; a firing circuit for discharging said storage capacitor means; a first variable voltage source; a second variable voltage source; a control circuit including a low charge level control circuit means arranged initially to couple said first variable voltage source to said charging circuit for charging the storage capacitor means to a first preselected energy level, a high charge level circuit arranged to couple said second variable voltage source to said charging circuit to energize said charging circuit for charging the storage capacitor means to a second preselected energy level, a low charge sensing circuit means responsive to the energy level of said storage means and effecting the actuation of a relay for triggering said firing circuit and discharging said storage capacitor means when said storage capacitor means is charged to said first preselected level to inject a first electrical surge in the load circuit at said second station, and a high charge sensing circuit means responsive to the energy level on said storage capacitor means and effecting the actuation of a relay controlling said firing circuit for triggering said firing circuit and discharging said storage capacitor means when said storage capacitor means is charged to a relatively higher preselected energy level thereby to inject a second electrical surge into the load circuit at said second station.

9. An apparatus for altering the configuration of a coil of an inductive device, said apparatus comprising: conveyor means for transporting said inductive member from one work station to another; a plurality of load circuits on said conveyor means, each of said load circuits having input contact members, at least one load circuit connection station for arranging an inductive device in at least one of said load circuits, an electrical surge injection station having an electrical surge supply circuit for supplying electrical surges to the load circuit at said surge injection station, means for controlling the movement of said conveyor means from one station to another, output means for establishing an electrical connection with the input contact members of at least one load circuit when the conveyor means moves a load circuit in position at the electrical energy pulse injection station, and said last mentioned input contact members being disengaged from the output means when the load circuit at said surge injection station is moved away from said surge injection station.

10. The apparatus as set forth in claim 9 wherein said conveyor means includes a rotatable turntable, said load circuit connection and said electrical surge injection station being located at diametrically opposite sides of said turntable, and said surge injection station including an enclosure with at least a portion thereof formed of transparent insulating material to permit an operator at said load circuit connection station to observe the load circuit positioned at said electrical surge injection station.

11. The apparatus set forth in claim 9 wherein said conveyor means includes a turntable with a plurality of radially extending partitions defining partitioned sections and wherein said load circuits are contained in at least some of said partitioned sections, said electrical surge injection station including a canopy overhanging the one of said partitioned sections positioned by the turntable at said electrical surge injection station, said one partitioned section and said canopy forming an enclosure for the load circuit contained in said one partitioned section.

12. The apparatus set forth in claim 9 wherein said electrical surge supply circuit comprises a storage capacitor means; a charging circuit for charging said storage capacitor means to preselected energy levels; a firing circuit for discharging said storage capacitor means; a first variable voltage source; a second variable voltage source; a control circuit means including a low charge level branch circuit arranged initially to couple said first variable voltage source to said charging circuit for charging the storage capacitor means to a first preselected energy level, a high charge level branch circuit arranged to couple said second variable voltage source to said charging circuit for charging the storage capacitor means to a second preselected energy level, a low charge sensing branch responsive to the energy level of said storage capacitor means to effect the triggering of said firing circuit and discharge said storage capacitor means when said storage capacitor means is charged to one of said preselected energy levels to inject a first surge in the load circuit at the surge injection station, and a high charge sensing branch responsive to the energy level of said storage capacitor means to effect the triggering of said firing circuit and discharge the storage capacitor means when said storage capacitor means is charged to the other preselected energy level to inject a second surge in the load circuit at the surge injection station.

13. An apparatus for altering the configuration of at least one coil of an inductive device by the use of electrical energy, said apparatus comprising: a work station for supporting at least one inductive device in a load circuit and for effecting a coil-transforming operation on at least a portion of said coil, an electrical surge supply means for supplying a plurality of electrical surges in a predetermined sequence to the load circuit, and means for coupling said at least one coil of the inductive device in the load circuit with said electrical surge supply means for sequentially generating in said coil a plurality of electrical surges to effect said coil-transforming operation on said portion of the coil.

14. The apparatus set forth in claim 13 in which said means for coupling includes a connector means comprised of at least one pair of fixed and movable jaws, said movable jaw being biased towards said fixed jaw, both of said jaws establishing an electrical connection with at least one coil.

15. The apparatus of claim 13 in which the electrical surge supply means comprises storage capacitor means connected in circuit with control circuit means, said control circuit means including a charging circuit for charging said storage capacitor means to predetermined levels, first and second variable voltage sources, first and second charge level control circuits for coupling sequentially said first and second variable voltage sources to said storage capacitor means, and first and second charge sensing circuit means responsive to the respective energy levels of said storage capacitor means for sequentially initiating the discharge of said storage capacitor means to the load circuit when the storage capacitor means is charged to preselected energy levels thereby to generate sequentially electrical surges in the at least one coil to effect the coil-transforming operation thereof.

16. An apparatus for altering the configuration of at least one coil accommodated by a core member of an inductive device by use of electrical energy, the apparatus comprising: means for arranging the inductive device having the at least one coil in a load circuit to effect a coil-transforming operation on the at least one coil; an electrical surge supply circuit; said load circuit including means for coupling the electrical surge supply circuit to the inductive device; said electrical supplying circuit comprising storage capacitor means, a charging circuit for charging said storage capacitor means to preselected energy levels, a firing circuit for discharging said storage capacitor means, a first variable voltage source, a second variable voltage source, a control circuit means including a first charge level control circuit arranged initially to couple said first variable voltage source to said charging circuit for charging the storage capacitor means further including a second charge level control circuit arranged to couple said second variable voltage source to said charging circuit to energize said charging circuit for charging the storage capacitor means to a second preselected energy level, a first charge sensing circuit means responsive to the energy level of said storage capacitor means and effecting the actuation of a relay for controlling said firing circuit and discharging said storage capacitor means when said storage capacitor means is charged to said first preselected level to generate a first electrical surge in the at least one coil of the load circuit, and a second charge sensing circuit means responsive to the energy level on said storage capacitor means and effecting the actuation of a relay controlling said firing circuit for triggering said firing circuit and discharging said storage capacitor means when said storage capacitor means is charged to the second preselected energy level thereby to generate a second electrical surge in the load circuit and alter the configuration of the at least one coil.

17. The apparatus of claim 16 in which the means for coupling the electrical surge supply circuit to the inductive device includes input contact members, and the electrical surge supply circuit includes output contact means for periodically establishing a closed electrical connection with the input contact members.

18. The apparatus of claim 13 including means for transporting the load circuit having the at least one inductive device supported therein between the work station and another station.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |

JOHN F. CAMPBELL, *Primary Examiner.*

J. CLINE, *Assistant Examiner.*